J. C. HIGGINS.
Mangers for Horses.
No. 134,601.    Patented Jan. 7, 1873.
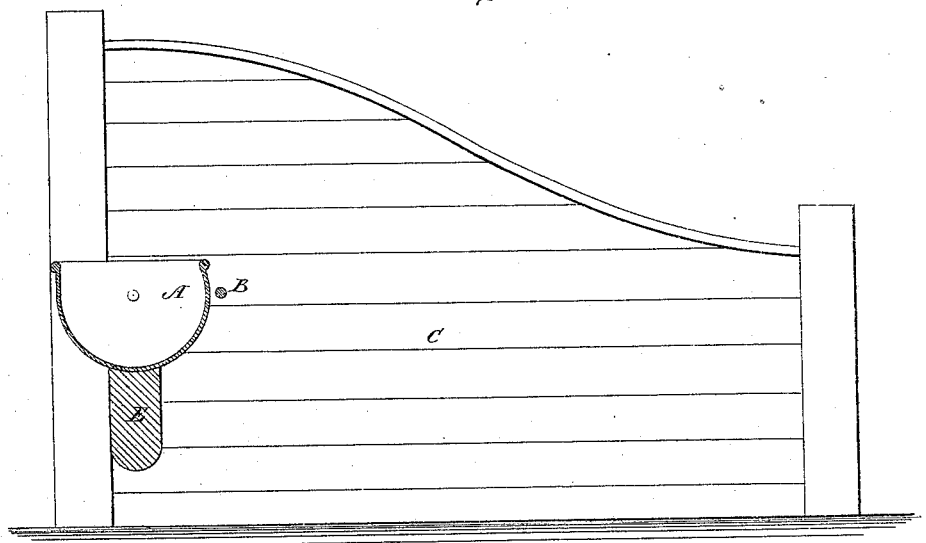
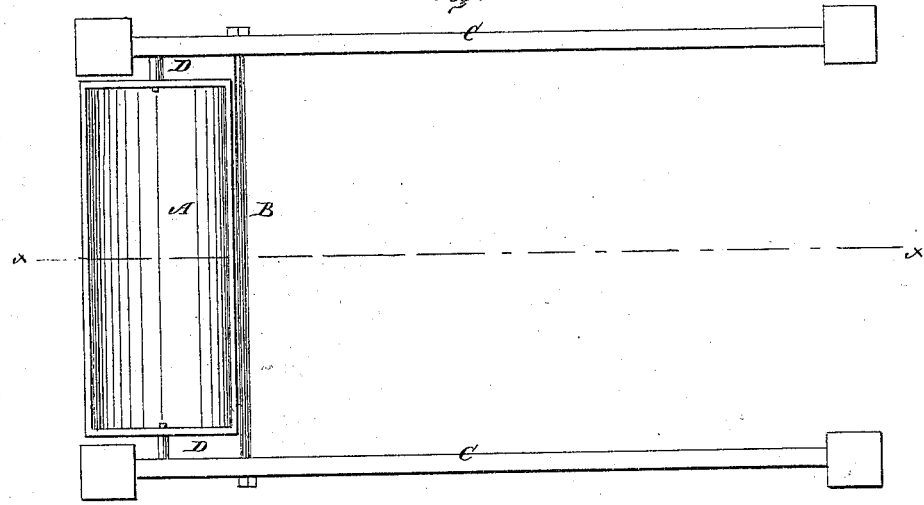
Witnesses:    Inventor:

UNITED STATES PATENT OFFICE.

JOSEPH C. HIGGINS, OF MILLSTONE, NEW JERSEY.

IMPROVEMENT IN MANGERS FOR HORSES.

Specification forming part of Letters Patent No. 134,601, dated January 7, 1873.

*To all whom it may concern:*

Be it known that I, JOSEPH C. HIGGINS, of Millstone, in the county of Somerset and State of New Jersey, have invented a new and useful Improvement in Mangers for Horses, of which the following is a specification:

The object of this invention is to so construct a manger for horses that the horse will be prevented from biting or gnawing it, and from what is known among horsemen as "cribbing;" and it consists in pivots or journals in the ends of the manger by which the manger is supported and on which it freely turns, and in a rod or bar secured parallel to and near the side of the manger.

In the accompanying drawing, Figure 1 represents a vertical section of a stall, showing my improved manger in cross-section, the section being on the line $x\,x$ of Fig. 2; and Fig. 2 is a top or plan view.

Similar letters of reference indicate corresponding parts.

A represents the manger. B is the rod or bar in front thereof. C represents the stall. D D are pivots or journals, either secured to the ends of the manger or in the sides of the stall, by which the manger is supported at the proper height from the floor. E is a weight of wood or other material attached to the bottom of the manger, by means of which the manger is made self-adjusting.

The weight may be made in any form and attached in any manner, either to the outside, as represented, or to the inside, on the bottom, or to the ends or end of the manger.

The rod or bar B is connected with the sides of the stall, and is placed near the front and upper edge of the manger, and so that the front of the manger will pass it as it turns on its pivots. By means of this rod the horse cannot gnaw the front or back of the manger, as the latter gives or turns as the horse attempts to seize it.

This arrangement of the manger and the rod soon breaks the horse of the habit of "cribbing," and induces him to remain quiet in his stall.

Having thus described my invention, I claim as new, and desire to secure by Letters Patent—

1. A horse-manger, supported on pivots and weighted at the bottom so that it will be self-adjusting, substantially as shown and described.

2. In combination with a manger constructed as above described, the rod B, as and for the purposes set forth.

JOSEPH C. HIGGINS.

Witnesses:
    CORNELIUS G. VAN CLEEF,
    JOHN VREELAND.